United States Patent [19]

Burton

[11] Patent Number: 5,253,565
[45] Date of Patent: Oct. 19, 1993

[54] PIZZA CONSTRUCTION AND APPARATUS

[76] Inventor: Gary B. Burton, 44 Eagle Crest Dr., #25, Lake Oswego, Oreg. 97035

[21] Appl. No.: 666,192

[22] Filed: Mar. 7, 1991

[51] Int. Cl.⁵ ............................................. A47J 37/06
[52] U.S. Cl. ........................................ 99/374; 99/349; 99/372; 99/376; 99/380; 219/524
[58] Field of Search .................................. 99/376–384, 99/372, 375, 374, 373, 349, 353; 219/524, 525

[56] References Cited

U.S. PATENT DOCUMENTS

| | | | |
|---|---|---|---|
| 992,417 | 5/1911 | Gale | 99/379 |
| 1,648,335 | 11/1927 | Cole | 99/374 |
| 2,423,963 | 7/1947 | Coffman | 99/376 |
| 2,469,595 | 5/1949 | Foster | 99/374 |
| 3,280,724 | 10/1966 | Kavanagh | 99/377 |
| 3,669,006 | 6/1972 | Lee, Sr. | 99/380 |
| 3,696,734 | 10/1972 | Beasley et al. | 99/375 |
| 3,814,005 | 6/1974 | Widdel | 99/379 |
| 3,880,064 | 4/1975 | Martinez | 219/524 |
| 3,899,962 | 8/1975 | Federico | 99/447 |
| 3,948,159 | 4/1976 | Vigerstrom | 99/374 |
| 4,178,500 | 12/1979 | Brindopke | 219/524 |
| 4,206,345 | 6/1980 | Maass et al. | 99/379 |
| 4,208,441 | 6/1980 | Westover | 426/293 |
| 4,749,581 | 6/1988 | Gorsuch et al. | 426/505 |

FOREIGN PATENT DOCUMENTS

| | | | |
|---|---|---|---|
| 2620048 | 11/1977 | Fed. Rep. of Germany | 99/372 |
| 590205 | 6/1925 | France | 219/525 |
| 720755 | 12/1954 | United Kingdom | 219/525 |
| 804367 | 11/1958 | United Kingdom | 99/375 |

Primary Examiner—Timothy F. Simone
Attorney, Agent, or Firm—Eugene M. Eckelman

[57] ABSTRACT

A pizza base unit of crust has a plurality of waffle-type depressions in its upper surface that receive pizza toppings and serve to anchor such toppings on the upper surface of the pizza. In the method of forming the pizza, raw pizza dough is formed into a pizza size portion and is subjected to a first cooking step to form a crust while simultaneously providing a plurality of the waffle-like depressions in its upper surface. Pizza toppings are then placed on the upper surface of the cooked crust and in the depressions and this assembly is then subjected to a second heating step to complete the pizza for consumption. Apparatus for carrying out the method includes a hot plate with cooking areas arranged to receive raw pizza dough for cooking into a pizza crust. The hot plate has a lid hingedly connected thereto, and such lid includes waffle-type forming portions arranged to face the hot plate surface in the closed position thereof and engage pizza dough on the cooking areas to form depressions in the pizza dough for receiving the toppings.

2 Claims, 2 Drawing Sheets

PIZZA CONSTRUCTION AND APPARATUS

BACKGROUND OF THE INVENTION

This invention relates to a new and useful pizza construction and to a method and apparatus for making it.

Pizzas are formed by making a batch of raw pizza dough, forming the dough into a selected size and shape, placing one or more toppings on the new formed dough, and then cooking the dough and toppings as a unit into a completed pizza. The cooked dough forms a bottom support crust. A disadvantage of this pizza structure and method of forming it is that precise control for uniform cooking of the dough is not possible. In order to fully cook the center portion of the dough into an edible crust by this prior method, the outside usually is overdone or even burned by the time the central portion is properly cooked. Thus the pizza often is not palatable whereby it must be destroyed and the process started over. Pizzas as now made also have another disadvantage. That is, the pizza dough is rolled out smooth and the toppings then freely placed on the upper smooth flat surface. After the pizza is cooked, it is usually eaten without utensils with the undesirable result that toppings frequently fall off.

SUMMARY OF THE INVENTION

According to the present invention, a pizza construction, method and apparatus are provided that are concerned with the making of an improved pizza.

More particular objects of the invention are to provide a pizza construction that has waffle-like depressions in its upper surface to improve crust quality and also to serve as anchor means for toppings supported on the crust; to provide a method for making a pizza that cooks the raw dough in an initial step while simultaneously providing a plurality of waffle-like depressions in its upper surface, placing toppings on the waffled top crust, and then cooking the combined crust and toppings in a final step to complete the pizza; and to provide an apparatus for constructing a pizza as above described.

In carrying out the objects of the invention, the pizza construction of the invention comprises a pizza base unit of crust provided with a plurality of waffle-type depressions in its upper surface. The crust supports pizza toppings on its upper surface that also extend down into the waffle-like depressions whereby such depressions, among other advantages, hold the toppings on the crust. According to the method of the invention, a pizza size portion of raw dough is first made and this dough portion is then cooked almost to a final state without the toppings for forming the pizza crust. This cooking step is done while simultaneously providing a plurality of waffle-like depressions in its upper surface. After this initial cooking step, pizza toppings are placed on the upper surface of the crust including in the depressions. Thereupon, the assembly of crust and toppings is heated to complete the cooking of the crust and also to cook the toppings. The invention also comprises apparatus specifically related to the construction of the pizza of the invention and to the method of constructing the pizza.

The invention will be better understood and additional objects and advantages will become apparent from the following description taken in connection with the accompanying drawings.

DETAILED DESCRIPTION OF PREFERRED EMBODIMENTS

Figure 5:
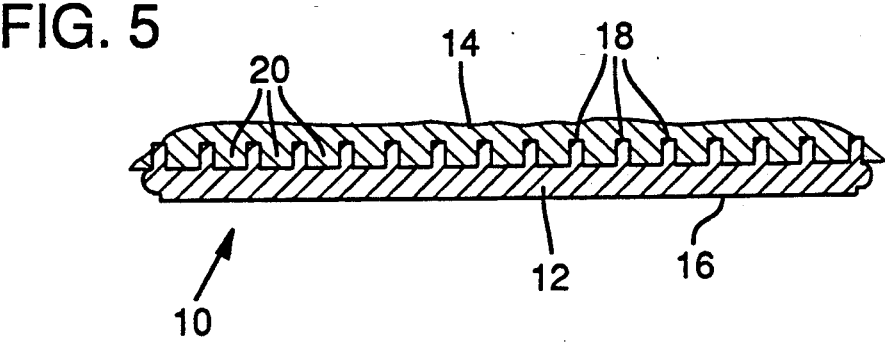
FIG. 5 is a sectional view of a pizza construction made according to the present invention.

With particular reference first to FIG. 5, the numeral 10 designates a pizza of the present invention comprising a supporting crust 12 and topping 14. Crust 12 is made of the usual raw pizza dough and topping 14 comprises the usual toppings of cheese, meat, vegetables, etc. The bottom surface 16 of the crust is flat and smooth and the top surface 18 is provided with a plurality of waffle-like depressions or recesses 20 that extend down approximately one-half the thickness of the crust. In the final construction for consumption, the toppings 14 cover the upper surface and also extend down into the depressions 20 whereby they are anchored to the crust. This anchored relationship of the toppings will eliminate much of the usual and undesirable separation of toppings from the crust when the pizza is being eaten.

The pizza construction 10 is formed by a particular method which comprises first forming a raw dough pizza size portion, namely, the size that is desired to make the crust 12, and then cooking this raw dough portion in an initial cooking step to form a crust that is just short of being fully cooked. Simultaneously with this initial cooking step, the top surface 18 is provided with waffle-like depressions 20. These depressions extend down approximately one-half the thickness of the crust when cooked. Thereupon, toppings 14 are placed on the upper surface 18 and also in the depressions 20 and then the crust with the toppings thereon is again heated to put them in a proper cooked condition for consumption. This secondary cooking step can be accomplished in a microwave oven if desired.

A special apparatus for constructing the pizza of the invention and for carrying out steps of the method is shown in FIGS. 1–4. A first embodiment, FIGS. 1–3, comprises a bottom hot plate portion 24 having pizza cooking areas 26 thereon such as shallow depressions. The arrangement of the areas 26 and the shape thereof may vary, as will be more apparent hereinafter. A closure member or lid 28 is connected by hinges 29 to the hot plate portion 24 and has waffle-like forming areas 30 on or in each top and bottom surface that correspond in number and size to cooking areas 26 on bottom portion 24 and that are arranged in proper alignment whereby to close down on respective areas 26 when the lid is hingedly closed. The areas 30 in one form comprise a plurality of projections 32 that form the waffle-like depressions 20 in the dough. These projections are of a length to extend into the dough to about one-half the thickness of the dough when cooked.

Figure 1:
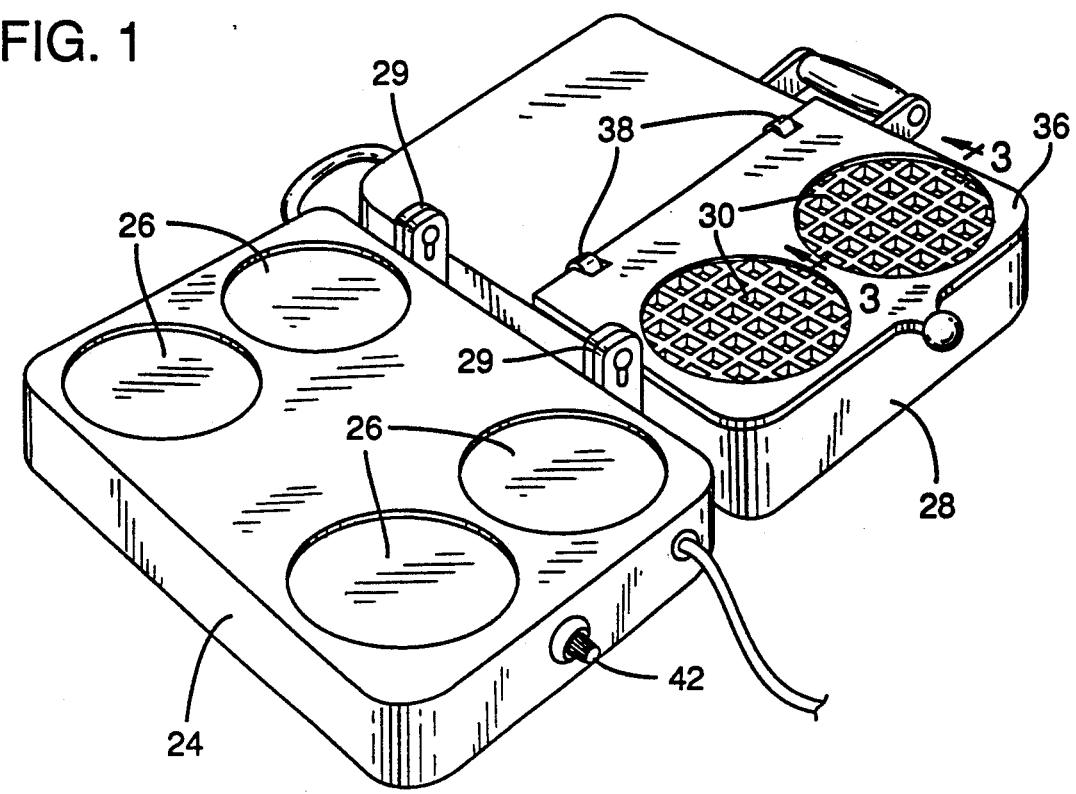
FIG. 1 is a perspective view showing apparatus for constructing the waffle, the apparatus being shown in one phase of its operation.
Figure 2:
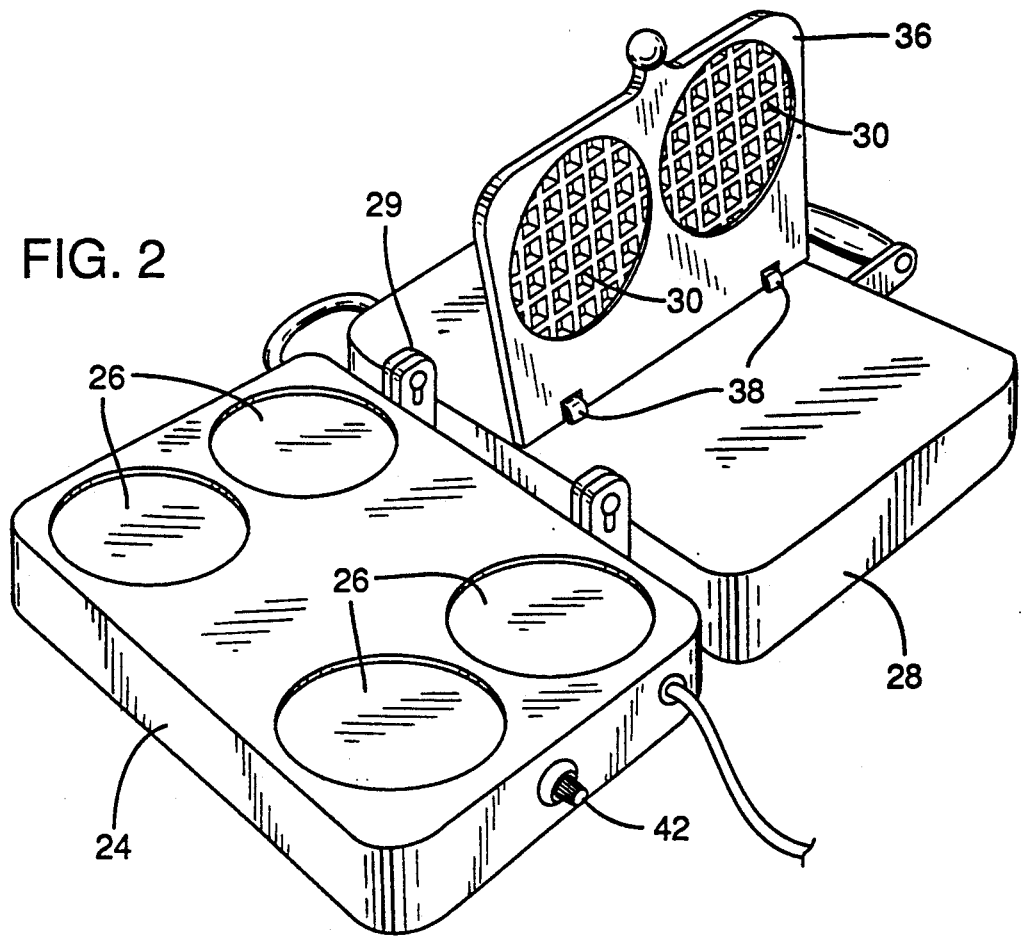
FIG. 2 is a view similar to FIG. 2 but showing a forming plate of the apparatus in the process of being moved to another phase of operation.
Figure 3:
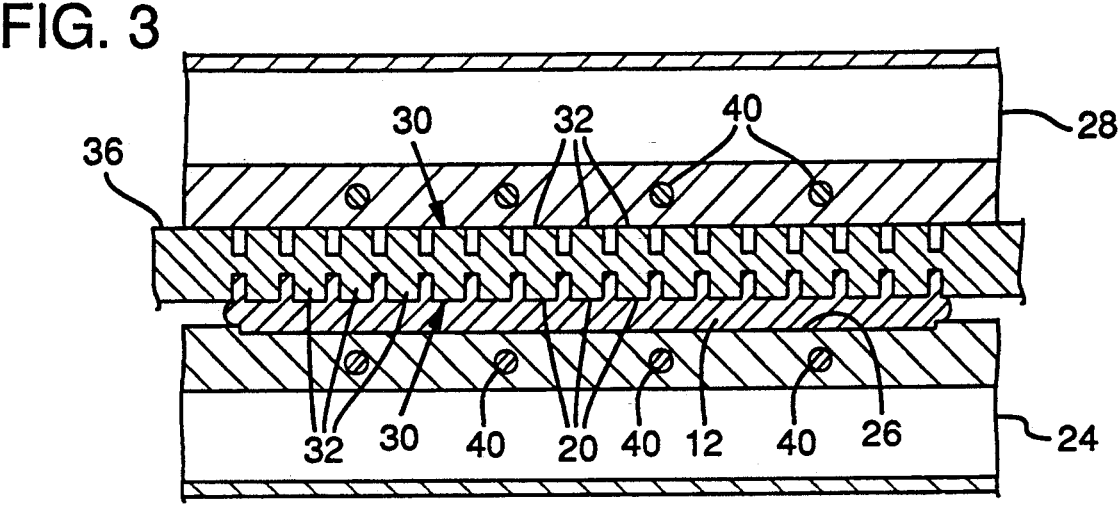
FIG. 3 is an enlarged fragmentary sectional view taken on the line 3—3 of FIG. 1.

In a preferred arrangement, the waffle-like forming areas 30 are supported on a forming plate 36 hingedly mounted on the closure member 28 by hinges 38. The axis of hinges 38 is at right angles to hinges 29 whereby the forming plate 36 is capable of being hingedly moved to a pair of side positions. As best seen in FIG. 3, the areas 30 are provided on each surface of the plate 36, the arrangement being such that in one hinged position of the plate, the areas 30 on one side will align with pizza cooking areas 26 on one side and when rotated to the other side the areas 30 will align with the other areas 26. FIG. 1 shows the plate 36 in a rest position on one side and FIG. 2 shows the plate in the process of being turned to the other side. The apparatus has suitable heating elements 40 in, the top and bottom portions, with control means 42 on the exterior of the apparatus that allows the operator to accurately control the cooking temperature for best results. In a cooking step, raw pizza dough is first placed on the two cooking areas 26 at one side of the hot plate portion 24. The forming plate 36 is pivoted to this dough loaded side and the closure member 28 then closed. The dough is cooked for a precise time and is formed with the depressions 32. After the cooking is accomplished, the closure member 28 is opened and the forming plate flipped to the other side. Thereupon, the toppings are applied to the crust and the closure member 28 again closed whereby the smooth surface of the latter engages the toppings and together with the hot plate portion 24 completes the cooking. This latter step can be accomplished in a microwave oven if desired.

The plate 36 facilitates the fast production of pizzas, if such is desired, by alternating positions thereof for the initial and secondary cooking steps. That is, in the initial cooking step wherein the dough is being cooked to form the crust with its depressions 20, the plate 36 will be pivoted over for alignment with this first side. The depressions will be formed and the dough cooked on this one side of the apparatus. When the crust has been cooked in this initial cooking step, the lid is opened and the plate 36 pivoted over to the other side of the closure member. At this time, the other two areas 26 in alignment with the plate as pivoted over will have been supplied by the operator with raw dough and the cooked crust on the first side will have been supplied with toppings. Thereupon, closing the lid will complete the pizza on the first side and will cook the dough and form the crust on the second side. By alternating these two sides in the manner described a rapid pizza production can be achieved.

The apparatus of the invention, being electrically controlled directly by control means 42, accurately produces desired and even cooking conditions of the crust. With the depressions 20 being formed into the crust during cooking thereof, such crust has a unique crisp taste. The size and shape of the depressions 20 in the dough can be varied for best results. Also, the size and shape of the pizza itself can be varied by providing cooking areas of the desired size and shape. By means of the method and apparatus of the invention, the crust is firm on the top whereby pizza sauce will not soak into the crust and become soggy. The depth of the cooking areas 26 can be varied to regulate the thickness of the crust. These areas also can be made to various shapes such as square, triangular, heart-shaped, etc. for novelty. The invention can be applied to commercial or home use.

Figure 4:
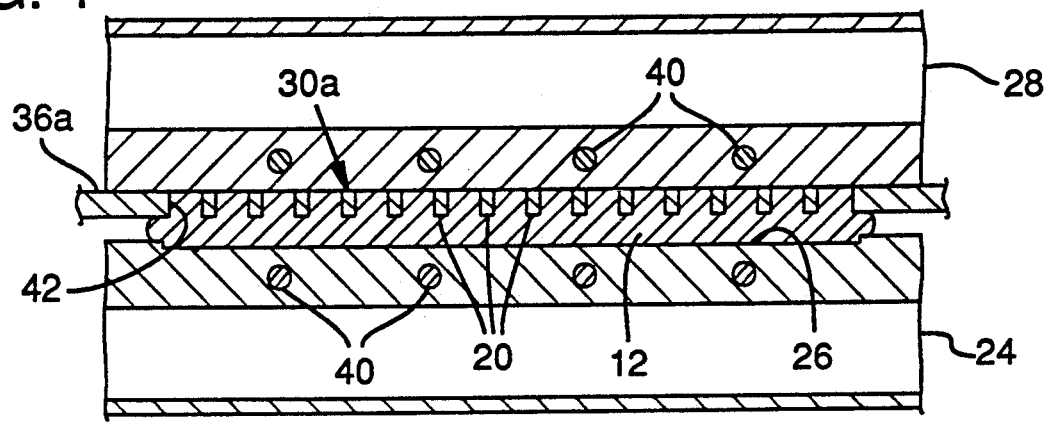
FIG. 4 is a view similar to FIG. 3 but showing a second structural embodiment.

FIG. 4 illustrates a modified structure of waffle-like forming plate 36a. In this embodiment, each area 30a comprises a bore 42 having a screen 44 supported therein that is of a shape and mesh to form the waffle-type depressions 20 when the lid is closed on the dough. The screened area works symmetrically from both pivoted positions of the plate 36.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A cooking apparatus for forming pizzas comprising:
    a base member,
    a hot plate surface on said base member having at least one pizza cooking area,
    said hot plate surface comprising a smooth upper surface arranged to cook pizza dough into a pizza crust with a flat bottom surface,
    a lid hingedly connected to said base member for opening and closing relation with said hot plate surface, and
    a waffle-type forming surface on said lid arranged to face said hot plate surface ion the closed position of said lid whereby to engage pizza dough on said hot plate surface and form recesses in an upper surface of the pizza dough when the dough is being cooked on said hot plate surface,
    said waffle-type forming surface being supported on a support plate having selected hinged movement on aid lid whereby said waffle-type forming surface is in alignment with said pizza cooking surface in one hinged movement thereof and is out of alignment with said pizza cooking area in another hinged movement thereof.

2. The apparatus of claim 1 wherein said hot plate surface includes at lest two pizza cooking areas, said hinged movement of said support plate being selected to align said waffle-type forming surface with one of said pizza cooking areas in one hinged position thereof and to align said waffle-type forming surface with the other of said pizza cooking areas in another hinged position thereof.

* * * * *